US009255478B2

(12) United States Patent
Purdum et al.

(10) Patent No.: US 9,255,478 B2
(45) Date of Patent: Feb. 9, 2016

(54) REACTION TURBINE AND HYBRID IMPULSE REACTION TURBINE

(71) Applicant: HYBRID TURBINE GROUP, Research Triangle Group, NC (US)

(72) Inventors: Howard Purdum, Research Triangle Park, NC (US); William Downs, Pembroke, GA (US); L. Vann Downs, Pembroke, GA (US)

(73) Assignee: HYBRID TURBINE GROUP, Research Triangle Park, NC (US)

( * ) Notice: Subject to any disclaimer, the term of this patent is extended or adjusted under 35 U.S.C. 154(b) by 347 days.

(21) Appl. No.: 13/659,492

(22) Filed: Oct. 24, 2012

(65) Prior Publication Data

US 2013/0101393 A1    Apr. 25, 2013

Related U.S. Application Data

(60) Provisional application No. 61/550,727, filed on Oct. 24, 2011, provisional application No. 61/636,964, filed on Apr. 23, 2012, provisional application No. 61/703,041, filed on Sep. 19, 2012.

(51) Int. Cl.
*F01D 1/16* (2006.01)
*F02K 7/00* (2006.01)
(Continued)

(52) U.S. Cl.
CPC . *F01D 1/16* (2013.01); *F02C 3/062* (2013.01); *F02C 3/085* (2013.01); *F02K 7/005* (2013.01); *F02K 7/08* (2013.01); *F02C 3/16* (2013.01)

(58) Field of Classification Search
CPC ............ F02C 3/16; F02C 3/165; F02C 3/045; F02C 3/05; F02C 3/062; F02C 3/08; F02C 3/085; F02K 7/005; F02K 7/02; F02K 7/08
USPC ................ 60/39.43, 39.44, 39.45, 39.76, 247
See application file for complete search history.

(56) References Cited

U.S. PATENT DOCUMENTS 2,435,042 A    1/1948  Johansson
2,540,948 A    2/1951  H. T. Jeffery
(Continued)

FOREIGN PATENT DOCUMENTS

GB      110 159 A      11/1917
GB      1 524 259       9/1978
(Continued)

OTHER PUBLICATIONS

ISO 3977-1:1997(en) Gas turbines—Procurement—Part 1: General introduction and definitions, Fig. 3. Publicly availabe at following URL: https://www.iso.org/obp/ui/#iso:std:iso:3977:-1:ed-1:v1:en.*
(Continued)

*Primary Examiner* — Phutthiwat Wongwian
*Assistant Examiner* — Marc Amar
(74) *Attorney, Agent, or Firm* — Birch, Stewart, Kolasch & Birch, LLP (57) ABSTRACT

A reaction turbine has channels formed in the top surface of a disc to create nozzles. The channels can be covered by a membrane sealed to the disc or by the housing extended from a combustor. Each channel may have a first section extending radially outwardly from an inlet of the reaction turbine and a second curved section extending from the first section to a periphery of the disc. A reaction turbine may also receive input from an impulse turbine. Fluid flows through the impulse turbine and fluid from the impulse turbine enters an inlet of the reaction turbine. The reaction turbine may have cooling channels and cooling fins to lower the temperature of the disc during operation. In addition, magnets may provide bearing support and electricity generation. In addition, the reaction turbine may have a dual shaft construction, with each shaft connected to a reaction turbine. One reaction turbine powers a compressor, while the second reaction turbine powers a load through the second shaft.

18 Claims, 10 Drawing Sheets

(51) Int. Cl.
*F02K 7/08* (2006.01)
*F02C 3/06* (2006.01)
*F02C 3/08* (2006.01)
*F02C 3/16* (2006.01)

(56) References Cited

U.S. PATENT DOCUMENTS

| | | | |
|---|---|---|---|
| 3,749,510 A * | 7/1973 | Gabryk | 415/103 |
| 3,945,757 A | 3/1976 | Cummens | |
| 3,962,888 A | 6/1976 | Eskeli | |
| 4,247,781 A * | 1/1981 | Bayer et al. | 250/492.3 |
| 4,332,520 A | 6/1982 | House | |
| 4,606,701 A | 8/1986 | McClay et al. | |
| 4,968,216 A | 11/1990 | Anderson et al. | |
| 8,850,791 B2 * | 10/2014 | Chen | 60/39.34 |
| 2001/0039369 A1 | 11/2001 | Terentiev | |
| 2003/0033808 A1 * | 2/2003 | Schlote | 60/772 |
| 2007/0116554 A1 | 5/2007 | Brewer | |
| 2008/0148881 A1 * | 6/2008 | Moniz et al. | 74/15.6 |
| 2008/0240904 A1 * | 10/2008 | Schlote | 415/89 |
| 2010/0307129 A1 * | 12/2010 | Chen | 60/39.35 |

FOREIGN PATENT DOCUMENTS

| | | | |
|---|---|---|---|
| GB | 1524259 A | * | 9/1978 |
| WO | 01/75275 A1 | | 10/2001 |
| WO | WO 2008119245 A1 | * | 10/2008 |

OTHER PUBLICATIONS

International Search Report and Written Opinion mailed Mar. 19, 2013.

* cited by examiner

REACTION TURBINE AND HYBRID IMPULSE REACTION TURBINE

CROSS-REFERENCE TO RELATED APPLICATIONS

This application claims benefit under 35 USC §119(e) to provisional applications 61/550,727, filed Oct. 24, 2011, to provisional application 61/636,964, filed Apr. 23, 2012 and to provisional application 61/703,041, filed Sep. 19, 2012, the contents of each of these applications is hereby incorporated by reference.

FIELD OF THE INVENTION

The present invention relates to a high efficiency turbine capable of operating on low quality fuels. This turbine is a hybrid of the two main types of existing turbines: reaction and impulse.

BACKGROUND OF THE INVENTION

In general, flow machines extract power from a fluid as the fluid flows from a higher energy state to a lower energy state. There are several types of flow machines, ranging from simple water wheels up to the most advanced gas turbines. Even though these machines have many differences, they all follow several basic laws.

Most notably, inventors from da Vinci to de Laval to Pelton have all noted that for maximum water wheel, the fluid must (1) enter slowly and evenly, or else losses will occur before the power can be extracted, (2) proceed through smooth, gradual steps, or else the power will be lost to the surroundings instead of being harvested, and (3) exit at essentially no velocity, because any residual velocity results in kinetic energy that is outside of the machine and thus cannot be converted to useful power.

Modern turbines depend on the laws of compressible flow fluid mechanics. The simplest case of these high velocity flows is the rocket.

The thrust of a rocket follows from Newtonian mechanics, where the force $\underline{F}$ is the time rate of change of momentum $\underline{p}$, or $$\underline{F}=d\underline{p}/dt$$

Because the momentum $\underline{p}=m\underline{v}$, where m is the mass and $\underline{v}$ is the velocity, the force equation becomes $$\underline{F}=d\underline{p}/dt=md\underline{v}/dt+\underline{v}dm/dt$$

For constant velocity v, the thrust thus reduces to $\underline{F}=m_{flow}\underline{v}$, where $m_{flow}=dm/dt$ is the mass flow rate.

The power P of the rocket follows from the general relation Power=Force×Velocity, or $P=\underline{F}\cdot\underline{v}$, which becomes $$P=m_{flow}v^2$$

for the special case that the rocket velocity equals the exhaust velocity. At this condition, the exhaust hangs still in space, with no residual kinetic energy.

Using the above overall principles, the simple rocket is thus at optimum efficiency with no incoming losses, smooth expansion, and no residual kinetic energy lost in the exhaust.

Like a rocket, the thrust of a jet derives from the ejection of high speed gases. Unlike a rocket, however, a jet receives surrounding air, which then becomes most of the exhausted product; the fuel is a relatively small fraction of the exhaust gas. The incoming air velocity must therefore be subtracted from the exit velocity, leaving the power relationship $$P=m_{flow}(v_{exhaust}-v_{jet})v_{jet}$$

where $v_{jet}$ is the jet velocity and $v_{exhaust}$ is the exhaust velocity. Note that if the incoming air were contained in the jet, the case becomes a rocket, and the jet power equation becomes the rocket power equation.

Unfortunately, applying the above general relationship of no residual energy in the exhaust requires that the exhaust velocity must equal the jet velocity. In this case, the air comes into the jet at the same velocity as the exhaust leaves the jet, and the net power is thus zero. Practical jets must therefore operate at a compromise between available thrust and efficiency.

Impulse turbines have a series of buckets mounted on a wheel. A jet of fluid directed at the buckets turns the wheel turns to generate power. Early workers found that the ideal approach is to direct the incoming stream at the edge of the bucket, not the center. The incoming fluid thus follows a semicircular path, leaving the bucket at the same speed at which the fluid entered. Furthermore, when the incoming stream enters at twice the speed of the rotating buckets, the net result is that the spent fluid is stationary in space. Thus, the maximum efficiency of an impulse turbine occurs when there is no kinetic energy left in the exhaust, as noted above for the rocket case.

Again using the relation that Power=Force×Velocity, the Power=$m_{flow}V_{stream}\times V_{bucket}$, or $$P=\tfrac{1}{2}m_{flow}V_{stream}^2$$

where $m_{flow}$ is the mass flow rate, $V_{stream}$ is the incoming jet stream velocity, $V_{bucket}$ is the bucket velocity, and $V_{bucket}=\tfrac{1}{2}V_{stream}$. Thus, for any given jet stream velocity, an impulse turbine yields only one half of the maximum, ideal power of a rocket operating at the same velocity.

The reaction turbine is an ancient machine, originally developed by Hero of Alexandria, and most often seen today as a common rotating lawn sprinkler. The overall principle is that fluid ejected tangentially from the periphery of a disc cause rotation of this disc. Despite this inherent simplicity, the reaction turbine has never been successfully utilized for power generation. The limitations follow from the basic design. Although the original records and prototypes are long lost, the generally accepted geometry is essentially a sphere with 2 opposing jets mounted at the centerline. When water is added to the sphere, and the sphere is then heated, the escaping steam spins the machine.

The above general relationship shows the underlying problems. First, feeding in water is obviously difficult with limited machining capability. The next concern is the conversion of water to steam, and the path of this steam. Ideally, this progression should be smooth, but with a spinning mixture of liquid and gas, combined with exits that move relative to the gas (no internal partitions), the internal process is complicated indeed, leading to significant losses. Finally, there is no provision to extract the gas smoothly through and out the nozzles, and no provision to match the rotation speed of the machine to the exhaust speed. It is therefore not surprising that the Hero turbine produces no useful power. Similar problems persist in more modern attempts.

Despite these problems, reaction turbines are potentially useful because they are inherently durable. Specifically, reaction turbines lack the delicate blades that limit conventional turbines. Reaction turbines can therefore be considered for geothermal, solar, topping, bottoming, and similar cycles that have large amounts of water mixed with steam, as well as other two phase systems.

Sohre has proposed one such system, using a separator to partition the water and the steam. One limiting factor is the simple physics relationship that the linear velocity v=r ω, where r is the radius and ω is the angular velocity.

The first problem with this relationship is that Sohre specifies a supersonic tip velocity, and shows the water jet at about half the tip radius. Therefore, using the above simple equation for velocity at a given radius, the velocity at the water jet is at least near sonic, if not supersonic. This is simply not practical for multiple reasons: (1) water is not compressible, and therefore does not follow the laws of compressible flow that govern the gas phase—the gas and water components of the unit are therefore not compatible, (2) water will be subject to pump work, as described below, and (3) the amount of water in any practical two phase system is inadequate to form a useful jet—the losses would be excessive for a small diameter nozzle, but a large diameter nozzle would be inadequate to serve as a plug for the steam.

Sohre states that the ejected steam has enough radial velocity to scrub the chamber walls. One problem is that the above general relationship states that any residual velocity decreases the efficiency. Furthermore, not only does this velocity exist, it is in the radial direction. Reaction turbines, however, produce no power from radial velocity—only tangential (or angular) velocity yields useful power. The nozzle arrangement shows the reason for this loss of efficiency: the nozzles eject both tangential and radial components.

The Sohre unit does, however, show the conventional de Laval converging and diverging nozzles, as needed to reach supersonic velocities. Sohre specifies that the actual location and size depends on the pressure drop. Sohre also notes that conventional reaction turbines compress their own working fluid during rotation.

The indicated location for the proposed convergent/divergent and throat section (discussed below) is near the periphery. Specifically, the throat location is within 10% of the periphery. Therefore, the flow must progress from subsonic to sonic to supersonic in the last 10% of the rotor. The above simple relation v=r ω, however, says that such a rapid speed increase is simply not possible while maintaining the specified tangential flow equations. That is, the available space allows for at most a 10% increase in velocity, not doubling or tripling the velocity.

Proceeding farther inwards, there is a flow zone that extends from the convergent section to the axis of rotation. Sohre claims that this section may or may not have guides, depending on whether the customer wishes to pay for them. With vanes, the fluid rotates with the rotor body. Without vanes, the fluid does not rotate with the body. The fluid that approaches the nozzles therefore has entirely different flow characteristics under the two suggested configurations. Recalling the above general principle that the internal flow must be smooth to avoid excessive losses, some choice must be made here. In addition, there is also the problem of mismatched tangential velocities, which again will be discussed more fully below.

Finally, progressing towards the axis reveals one last problem that is quite instructive: mass conservation. The underlying principle here is that flow machines cannot store or release fluid. Quantitatively, the mas flow relationship is $$m_{flow} = \rho A v$$

where ρ is the density, A is the cross sectional flow area, and v is the flow velocity.

The fundamental problem here is that compressible flows, such as air or steam at high velocity, have properties that limit the types of flow that are possible. Specifically, to achieve supersonic flow, as specified by Sohre, the flow must first pass through a converging section, where the velocity increases. Eventually, the flow reaches the speed of sound, Mach 1, at the narrowest point in the channel. The channel then diverges. With sufficient pressure head, the flow then accelerates beyond Mach 1 in this supersonic section. The limiting condition here is that the narrowest point is called the throat: no more than the given flow can pass through this "critical area." Sohre's unit, however, violates this principle because the axis inlet is much smaller than the throat. Furthermore, the throat area is much, much greater than the inlet area. Therefore, Sohre's unit violates the above mass flow rate law: it is simply not physically possible for any given mass flow rate to satisfy the contradictory conditions in the Sohre geometry.

U.S. Pat. No. 5,236,349 (Fabris) presents a later approach to reaction turbines. Unfortunately, the Fabris unit begins with a problem already cited by U.S. Pat. No. 4,336,039 (Sohre): limited exhaust nozzle arrangements. Specifically, the Fabris unit has only two outlet nozzles. Most of the disc is therefore wasted space. Such an arrangement is simply not competitive on a mass and volume basis with conventional turbines.

Another problem with the Fabris unit is the inlet zone at the axis. Like the Sohre unit without partitions, this zone is not partitioned, and therefore suffers from the unequal distribution problems that date back to Hero. Furthermore, the Fabris unit also suffers from excessive efficiency losses due to high inlet velocities, as discussed more fully below.

Fabris, however, does recognize the conservation of flow limits, and the constriction to the throat is at a reasonable radial distance. Fabris also recognizes the compression effects in the rotor, primarily in regard to pressure relative to flash vaporization of the two phase (water and steam) fluid.

However, the computer program that Fabris uses to calculate these effects has flaws. First, Fabris describes a linear velocity profile, and then proceeds to use this profile for the rest of the calculations. This specification implies that either the linear profile is the only possible profile, or there is some preference for the linear profile. Actually, there are many possible profiles, and many of them provide significant improvements over the linear form specified by Fabris (discussed more fully below).

More importantly, Fabris then uses this linear profile in an iterative scheme to determine the flow contours. The iteration limit is the predicted gas velocity in the moving rotor, versus the gas velocity in a stationary rotor. Fabris then uses the converged case for testing.

The difficulty here is that Fabris has omitted crucial terms in the computational model: losses and the work done by the gas on the rotor in the tangential direction prior to the exit. Because these terms decrease the exit velocity in the rotating case, the Fabris algorithm of mandated identical exit velocities invariably converges to the wrong solution. This topic is discussed more fully below, but for here, note that a 180 degree change of gas direction in the tangential rotation plane (Fabris FIG. 3) yields results that are in error by at least 50%. Such large discrepancies are simply unacceptable in turbine work, where variations of even fractions of a percent are important.

Beyond the patent literature, Comfort provides the simplest, most complete analysis of the principles of the reaction turbine. In particular, Comfort cites the omission of the pump work in most text books.

SUMMARY OF THE INVENTION

A turbine integrates an impulse component and a new reaction component. Impulse turbines are inherently less efficient than reaction turbines, but the combination of the two systems provides multiple advantages, including high efficiency, high durability, low cost, broad power band and the ability to use a wide variety of fuels. The fuel range includes all conventional turbine fuels, as well as unconventional fuels such as coal, biomass, unrefined crude oil, and two phase mixtures, notably steam and water combinations.

The two component turbines may be mounted on a common central shaft or have a split or dual shaft. Unlike the shafts in other reaction turbines, this shaft is solid to maximize strength and minimize vibration. The working fluid first enters the impulse turbine at subsonic speed for minimum losses. A labyrinth seal contains the high pressure input, even during vibration. All that is required is that the exhaust gases have near zero tangential velocity when entering the subsequent reaction turbine. The pressure head is then passed to the reaction turbine, where zero tangential velocity is maintained throughout the flow path.

The radius of the impulse turbine is significantly smaller than the radius of the reaction turbine. The impulse turbine can therefore operate at subsonic speeds for minimum losses while the reaction turbine operates at supersonic speeds for maximum efficiency.

The turbine has multiple nozzles (more than the usual 2) symmetrically arranged for no interference while yielding maximum output at completely tangential flow. The combined system is short in length and diameter, thereby yielding maximum power with minimum weight. The overall shape of the turbine is essentially a flat disc. The advantage of this geometry is that the system is easy to balance with conventional dynamic techniques. Furthermore, the system can be mounted so that it is self-balancing at speed, much like a centrifuge rotor.

For heat control, the system may incorporate conventional high temperature alloys. Ports in the rotor provide active cooling without draining compressor air, thus maintaining high efficiency. Furthermore, the smooth, long radius curves can be easily coated by ceramics. Full ceramic construction is also a possibility as newer materials become available. Without the fragile blades of conventional turbines, the turbine can incorporate ceramics and other advanced materials that cannot currently be used.

The base of the reaction turbine can contain magnets for bearings and for integrated electrical power generation. The assembled system is therefore simple and cheap to manufacture, including the option of single dimension milling for low cost systems. The resulting device is sufficiently durable to operate in harsh environments. Furthermore, this high durability allows the use of cheap regenerators or recuperators without the risk of system failure due to heat recovery unit breakdown.

The system is designed for maximum shaft power. Specifically, the system has no bypass losses, thereby yielding high power levels even at the small scales that cannot currently be serviced by other turbines. The shaft power output can be converted to thrust simply by reducing the effectiveness of the reaction turbine section. The contours of the combined system are effective only in specific ranges, thereby inherently limiting the maximum speed and thus eliminating the surging problems of conventional turbines.

The combination of reaction and impulse turbines provides many advantages over impulse turbines acting alone. First, impulse turbines alone cannot provide the large pressure drops that are necessary for high efficiency. Furthermore, the impulse turbines used for geothermal and other two phase flows operate at high speeds, and are therefore subject to damage from water droplets and debris.

Conversely, the impulse turbine in the present invention operates at relatively low speed, where impact damage is negligible. Recalling the above relationship between rotational speed and linear velocity, the impulse turbine located near the axis is thus ideally matched to the much higher velocity nozzles at the perimeter of the disc. Another advantage of this unique low speed operation is that the input flow can be kept subsonic, versus the supersonic flow of higher speed systems. The immediate advantage is that subsonic flows can be turned through the required angles with minimal losses, compared to the much larger losses that occur when turning supersonic flows.

The present invention can also be configured as a reaction turbine without an impulse component, as well as a dual shaft system.

BRIEF DESCRIPTION OF THE DRAWINGS

FIG. 9b is a side view of the turbine of FIG. 9a.

DESCRIPTION OF THE INVENTION

Figure 1:
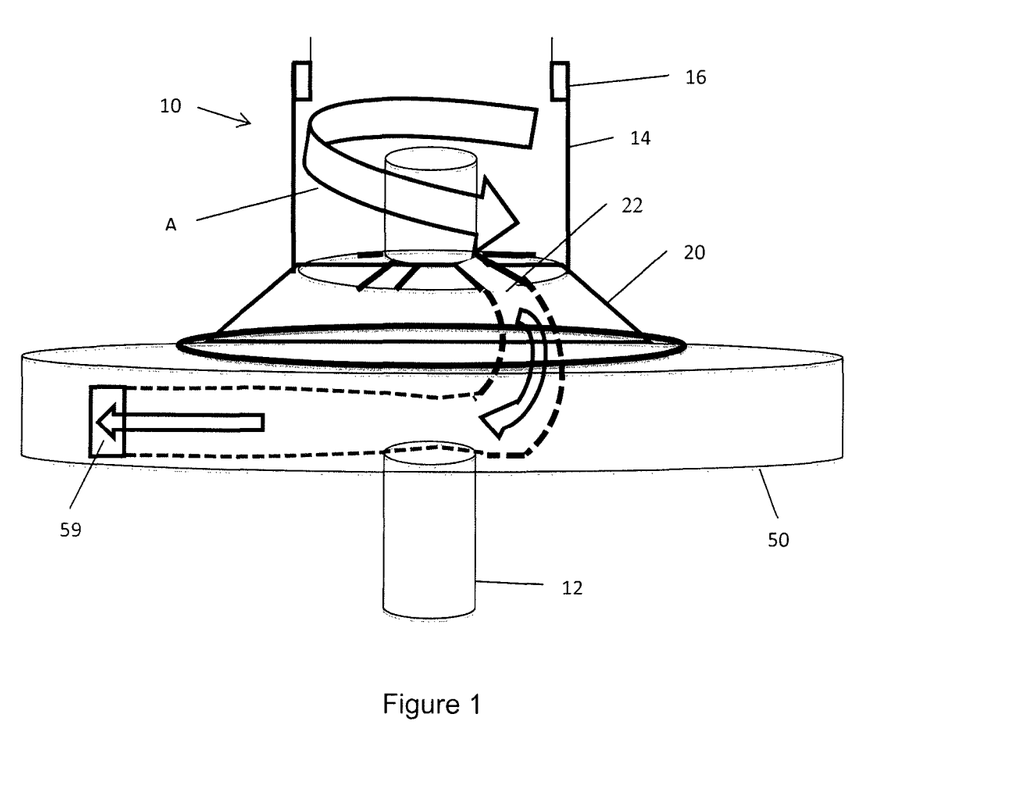
FIG. 1 depicts the hybrid turbine.

As seen in FIG. 1, the hybrid turbine 10 has a solid shaft 12 supporting all components and powered by the turbine components. An intake conduit 14 supplies fluid from any suitable source, such as a combustor. The fluid has a vortex motion, shown by arrow A as the flow moves about solid shaft 12 and enters the top of impulse turbine 20 through intakes 22 extending radially from the shaft 12 about a top wall of the impulse turbine 20. The impulse turbine is shown with a conical sidewall, but the sidewall may by cylindrical.

The above system uses a single incoming flow from the combustor, progressing from the combustor to the rotor. For maximum power density, the flow can come from two combustors, or a split stream source, etc. In this case, the flow chamber size must be doubled. The net result is extremely high power density for aerospace and other limited work space applications. Guide vanes in the intake can direct the flow smoothly into the channel. Note that these guide vanes do not contribute work output, as done in a conventional impulse turbine.

The result is that the incoming flow is smoothly guided from the combustor, through the impulse turbine, and then into the reaction turbine. In particular, the flow emerging from the impulse turbine is at zero angular velocity as seen from an external, fixed observer, thereby matching the flow in the rotor channels. This smooth flow path yields maximum overall efficiency.

The input fluid enters along the sides of this central shaft 12 through a labyrinth seal 16. This seal tolerates imbalances during start-up and shut-down. The flow is directed partially downward, with rotation about the central axis to create a helical flow. The curved supply ductwork of conventional radial inflow turbines is already known to provide such flows, so this approach is therefore proven and also provides a direct conversion mechanism for conventional installations. The impulse turbine directs the input stream counter to the rotation of the reaction turbine 50.

Figure 2:
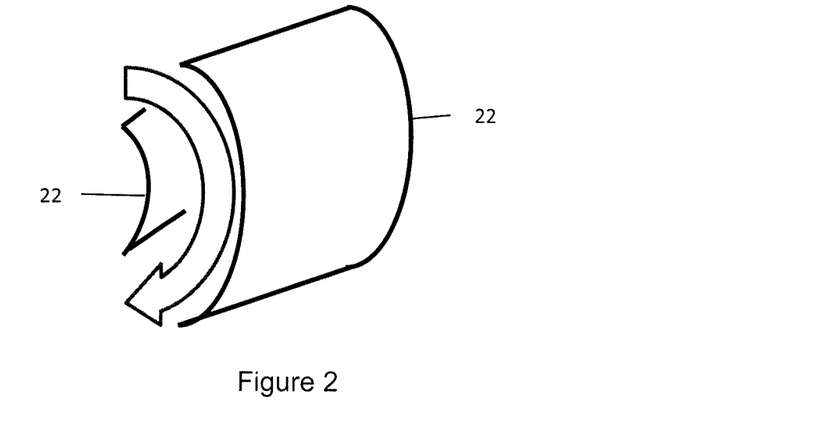
FIG. 2 depicts the arrangement of the impulse turbine buckets, relative to the underlying reaction turbine.

The impulse turbine is formed by a plurality of arcuate buckets 22. The pressurized gas enters the turbine in the spaces between the buckets, with each bucket forming a surface of two flow paths, as can be seen in FIG. 2. Impulse turbines are most efficient when the incoming stream is moving at twice the angular velocity of the buckets. At this condition, the velocity of the exhaust stream appears to be stationary. This provides the necessary link to the reaction turbine, discussed below.

The flow impinges on the outer bucket curve, imparting a force on the impulse turbine to create a counterclockwise rotation from a counterclockwise fluid being introduced to the turbine. The flow is not only reversed in the buckets, but directed radially outwardly and downwardly. The flow enters the lower reaction stage at a significant distance from the axis.

The impulse turbine in this configuration is referred to as "partial admission axial flow." The "partial admission" term designates that only part of the flow area is open at any one time. "Axial flow" simply means that the net flow in the impulse turbine section is parallel to the axis of rotation. This configuration is best suited for (1) limited amounts of working fluid, and (2) low rotational speeds.

Figure 3:
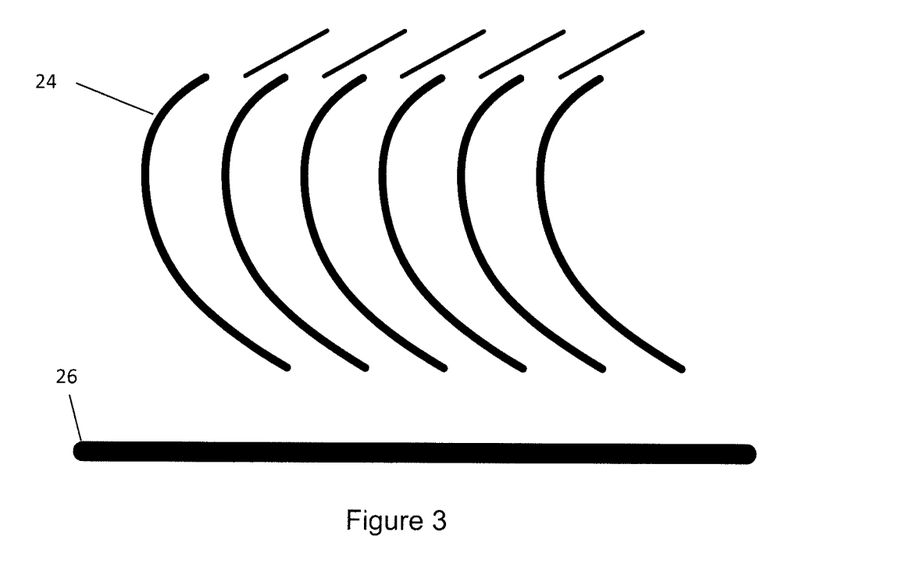
FIG. 3 depicts the buckets relative to a deflection plate.

The present turbine also allows a simple full admission configuration, as shown in FIG. 3. Here the buckets 24 are closely spaced, versus the partial admission gaps in FIG. 1. The input gas angle in FIG. 3 is approximately 30 degrees to a plane of rotation of the impulse turbine, and the input angle of the buckets is about 20 degrees, as is typical of conventional impulse turbines. These angles are chosen to provide a net motion along the axis; otherwise, the fluid would build up and block the flow. Conventional turbines accept this "entering and leaving" loss. Ideally, the flow would be all in the rotational direction for maximum efficiency, but this is not possible in conventional axial flow impulse units.

The present turbine has a deflector plate 26 placed at the exit of the impulse turbine. One form of this plate is a disc mounted on the axis of rotation. In its simplest form, the deflector is the outer surface of the reaction turbine wall.

As this flow hits the deflector plate, it emerges through the opening between the plate and the buckets shown in FIG. 3. When exiting the buckets 24, there is no rotational motion as observed from a fixed external point. The geometry is selected so that the annular flow area along the axis and exiting from the impulse turbine matches the cylindrical cross-sectional flow area out in the radial direction toward the reaction flow channels, which will be described later. Of course, these two areas are not an exact match due to 3-dimensional effects, smoothing of the disc and axis at the joint, and other refinements common in fluid mechanics. These secondary effects, however, are sufficiently small that a one-dimensional analysis provides a good starting point for experimental and theoretical development. The immediate physical result of this arrangement is that the fluid emerging from the impulse turbine and deflector disc has a well-characterized flow consisting of specified rotational and radial components.

Figure 4:
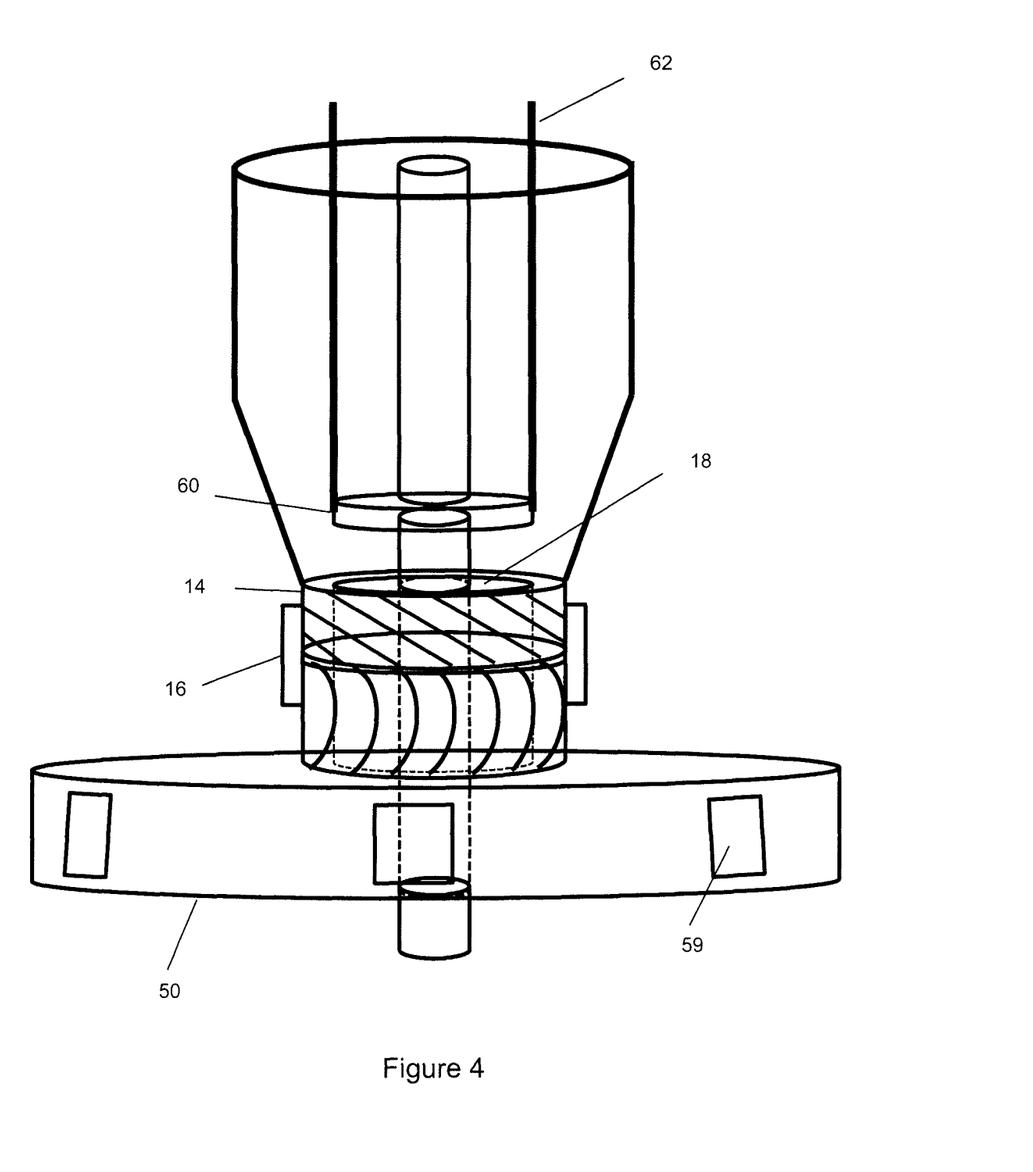
FIG. 4 depicts the hybrid turbine having buckets in the impulse turbine section.

FIG. 4 depicts another embodiment of the hybrid turbine, where buckets in the impulse turbine section are further divided by a cylindrical wall 18 that is coaxial to the shaft. This wall thus divides each bucket into two sections. Because these sections are approximately equal in total area, the outer section is therefore bound by two radii that are closer together than the two radii that limit the inner section. The outputs of these sections towards the reaction turbine remain the same as if the divider were not in place. The input, however, is slightly indented from the original configuration.

Furthermore, these indentations correspond to modifications in the input nozzle 14. Specifically, the nozzle is now likewise divided in the radial direction. The outer nozzle section remains as before. The inner nozzle section, however, is now separated from the outer section across the indentation and paired to a coaxial, movable annular ring 60 acting as an occlusion. The ring 60 has a diameter equal to the diameter of the cylindrical wall 18. When displaced by an external control rod 62, this ring partially or completely occludes the inner flow channel of the impulse turbine as needed.

When the ring is in contact with the cylindrical wall 18, the system works as before: the incoming flow has twice the angular velocity of the rotor, and the system behaves as a conventional impulse turbine. However, when the ring is completely retracted, the additional cross sectional flow rate drops the incoming velocity by half. The incoming angular velocity now equals the angular velocity of the rotor. The incoming flow therefore does no work on the impulse component. Of course, this arrangement has no use in conventional impulse turbines, however, this arrangement passes the maximum possible flow head to the more efficient reaction turbine, thereby improving overall system efficiency.

Note that the axial velocity component still provides the overall cross sectional flow restrictions as described above for the exit spacing. The only difference is that when the inner sector is occluded, the exiting flow from the impulse turbine separates when turning radially to the reaction turbine, thus leaving a stagnation zone at the base of the inner sector. Curvature as per standard fluid mechanics techniques minimizes turbulence losses to this zone. This arrangement also holds for partial occlusion. It is possible to reverse the role of the two sections if desired. For example, heavily particle laden flows cause less bucket erosion when introduced at full impulse mode near the axis, but this effect is minor.

In addition to the movable central disc obstruction, it is also desirable to be able to close the outer inlet completely and independently. In this case, the obstruction consists of a second movable annular ring, centered about the turbine axis, and enclosing the previously described solid disc obstruction. In other words, the second movable annular ring has an inner diameter equal to the outer diameter of the ring 60. The advantage of two completely independent regions is that different bucket shapes can be used in these regions to provide any desired flow combination. For example, the outer ring can be configured for maximum impulse efficiency, as desired for low flow, part load operation. Such configurations would emphasize small incident angles, on the order of the 20 or 30 degrees commonly used in impulse turbines. Furthermore, the incoming angular velocity would be approximately twice the turbine angular velocity. Conversely, the inner ring would use quite sharp angles and an inlet velocity approximately equal to the rotor velocity. These conditions would produce minimal impulse work, but ideal flow guidance for high throughput applications.

After leaving the impulse turbine, the fluid enters the reaction turbine. FIGS. 5-8 depict different reaction turbines. These reaction turbines can be used with or without an impulse turbine, as will be explained. Each of these turbines can be made by forming channels 52 in a top surface of a disc by any conventional method such as molding or machining. The channels serve as nozzles in the reaction turbine and each channel has an inner and outer sidewall. Once the channels are formed in the top surface, a flat membrane 57 having an inlet can be secured to the top of the disc to form the reaction turbine, as seen in the cross sectional view of FIG. 8A. For sake of clarity, only two channels are depicted.

Another option is to eliminate the channel cover. In this arrangement, the housing from the impulse turbine, or the combustor if there is no impulse turbine, is extended radially outward parallel to the rotating disc, while kept in close tolerances of the disc, on the order of a millimeter or so. Under this arrangement, no labyrinth seal is needed. Instead, the gas is constrained by the close proximity of the fixed cover. Although this configuration allows some losses, these losses are small for low pressure drops and tight tolerances. The immediate advantages include high speeds with minimal stresses and cheap, maintenance free operation due to the absence of the labyrinth seal. This arrangement is discussed in more detail later with respect to FIGS. 9a and 9b.

In the present invention, the channels are rectangular, thereby minimizing internal circulation losses. In addition, the channels are all at the same depth, with the required variation in the cross sectional area thus dependent only on changes in the width of the channels. The immediate advantage of this approach is greatly simplified construction because a milling machine must handle variations in only one dimension instead of three. Moreover, all of the variation can be handled in only one disc, instead of two. This approach thus cuts the remainder of the milling part of the fabrication effort in half.

In each of these figures, the channel is depicted as extending from an inlet. The outer circle denotes a circumference at which the radial velocity component becomes zero, leaving only a tangential component. The outer edge of the reaction turbine is not shown but, as mentioned above, the outer edge of the turbine is the point where the outer side wall of the channel becomes tangential to the sidewall of reaction turbine.

Figure 5:
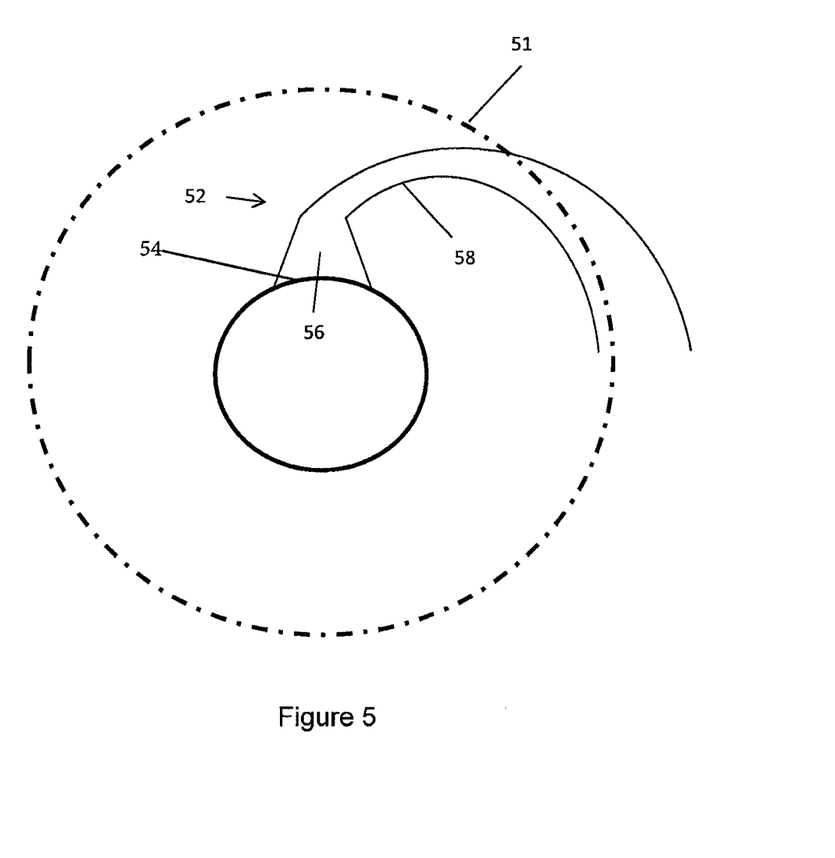
FIG. 5 is a plan view of a reaction turbine disc.

FIG. 5 is a plan view of a rotor having channels with both straight and curved sections. Progressing from the axially oriented inlet, the incoming gas has a tangential component that matches the rotational velocity of the rotor at the opening of the channel. The incoming axial velocity component thereby converts directly into radial outgoing velocity. Next, the gas compresses slightly as it proceeds through the straight section of the channel.

The straight section then joins the second section. In this section, the compression decreases, and internal thrust work begins. Next, the curvature in the channels becomes greater in the center of the rotor, and compression decreases rapidly while thrust increases rapidly. The progressive decrease in pressure is accompanied by a decrease in temperature. Eventually the channel curvature transitions to a fully tangential path. At this point, no more compression occurs, and all of the previously generated pressure head has been converted to thrust.

The reaction turbine 50 has a series of channels 52, each having a sonic throat to increase the fluid velocity and an exit nozzle that is tangential to the outer surface of the reaction turbine. FIG. 5 depicts only one of the channels 52 of the reaction turbine for clarity purposes. The channel has an inlet 54 and a first section 56 extending radially outwardly from the inlet 54. The first section has a decreasing cross sectional area. The decrease in cross-sectional area may be due to a frustoconical shape, or the channel may have a constant height and decrease in circumstantial distance as it extends radially from the center. The first section 56 transitions to a second section 58 defining a curved path from the first section 56 to an outlet 59 in the edge of the reaction turbine. As noted above, the outer circle denotes where the radial velocity component of the fluid is zero, leaving only a tangential component. At exit, the gas flow is tangential to the circumference of the reaction turbine, not shown in the figure for purposes of clarity.

In this particular example, a four (4) atmosphere compressor produces an exit velocity of about 500 m/sec for a rotor with no straight section. Under these conditions, the system is a conventional CBE (where CBE denotes Combustor Burner Expander as per Wilson and Korakianitis nomenclature) Brayton cycle with about 30% efficiency. Conversely, the current CBceE (where ce denotes small compression and expansion in the rotor) system has an exit velocity of about 700 m/sec, yielding about 60% efficiency. The present CBceE configuration therefore has twice the thermal efficiency of the CBE system. Likewise, because the mechanical efficiency depends on the square of the velocity, the CBceE system yields 490,000 m/sec squared output, which is about twice the 250,000 m/sec squared output of the CBE system.

Figure 6A:
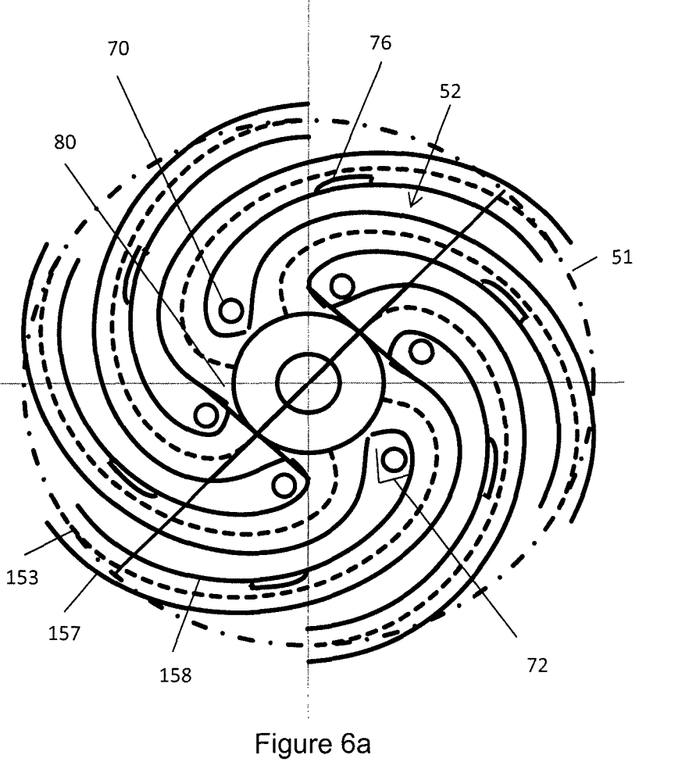
FIG. 6a is a plan view of a reaction turbine disc of FIG. 5 with multiple channels.

FIG. 6 depicts multiple channels 52 of a reaction turbine rotor not having an impulse turbine component. Each channel has an outer sidewall 157 and inner sidewall 158. Without an impulse turbine component, the incoming tangential velocity of the gas is the same as the rotor tangential velocity. Furthermore, the axial velocity of the incoming gas is now directed in the radial direction.

Under this configuration, the rotor is performing pump work on the gas, unlike previous curved channel designs, such as Fabris, that eliminated all pump work. Instead, the resulting small amount of pump work overcomes losses due to turbulence, non-ideal application of thrust, etc. The net result is an ideal pressure head, thereby yielding maximum exit velocity which in turn yields maximum efficiency.

The channels are therefore perpendicular at the junction with the inlet. The dotted line 153 denotes the centerline of the fluid flow. As before, the outer circle 51 denotes the distance at which the radial velocity component becomes zero. The outer circumference of the rotor would have a slightly larger diameter then this outer circle 51. Six channels are shown, but this number may be varied based on rotor size and intended application of the rotor. The rotor is provided with cooling holes 70 between the channels 52. The cooling holes lead to cooling channels extending between the channels 52. In addition scoops 72 may be provided at the cooling holes to direct air into the cooling holes and then into the channels. In addition, cooling fins can be added to the rotor, as will be explained later.

As described elsewhere, the channels have constant depth for ease of fabrication and simple sealing. The exception to this constant depth geometry is at the entrance of the channels, where the depth is decreased over a short region (typically about 5 to 10 percent of the total channel length). To maintain the needed mass conservation, an increase in width accompanies this decrease in depth. As shown in FIG. 6, this increase in width 80 near the inlet continues until the sides of the adjoining channels meet at the respective channel entrances. This arrangement provides a uniform transition from the inlet to the channels. As per standard fluid mechanics procedures, optional guide vanes can be placed at this juncture.

All turbines suffer from limited off-peak performance. The underlying physical principle is that the chamber geometry limits the expansion of the compressed gas. In rocket theory, the expansion regimes are called (1) under-expanded for cases in which the nozzle does not expand sufficiently to capture all of the gas potential, (2) ideally-expanded for cases in which the nozzle captures all of the gas potential, and (3) over-expanded for cases in which the nozzle has more expansion than needed.

Ideal expansion is the obvious target, but this condition cannot be satisfied by any fixed system operating over a broad range of speeds as required for aerospace, automotive, and utility loads. Variable geometries, such as the pilot-controlled exhaust ducts of advanced fighter aircraft engines, are not practical in commercial technologies. The enhanced expansion control technology of the present invention therefore consists of a fixed geometry that is capable of inducing multiple fluid flow paths depending on the input flow conditions.

Beginning with the ideal conditions, the flow geometry is ideally expanded, as needed for optimum efficiency. However, at less than ideal conditions, as existing during start-up and at part load operation, the geometry is over-expanded. At this point, some flow separation occurs, as the flow becomes detached from the channel walls.

Figure 6B:
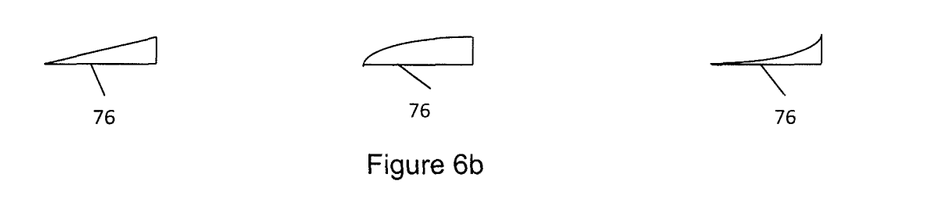
FIG. 6b depicts various profiles of wedges in the channels.

Following preliminary rocket work, the present invention strongly induces this separation at off-peak conditions, thereby effectively reducing the available flow area. Unlike the existing rocket work, however, advanced computer models show that the separation in the present invention occurs preferentially on the innermost side of the flow channel. For this reason, separation wedges 76 are placed radially along the channel as indicated in FIG. 6a. Under low fluid velocity conditions, the separation caused by the separation wedges 76 causes the channels to behave as if they have a reduced cross sectional area, thereby improving performance. The various profiles of the separation wedges are depicted in FIG. 6b.

When the flow is at optimum conditions, these wedges produce only minor disturbances in the flow field, with only a negligible loss in efficiency. At off-peak conditions, however, these wedges induce a stagnant separation zone that fills much of the downstream flow chamber. This zone thus partially occludes the flow stream, thereby yielding the desired decrease in effective cross sectional area. Of course, the resulting flow pattern is not as efficient as the ideal expansion, and is not completely effective over all flow conditions. This modified flow field, however, does provide better results off-peak than can be achieved with uniform expansion geometries.

Figure 7:
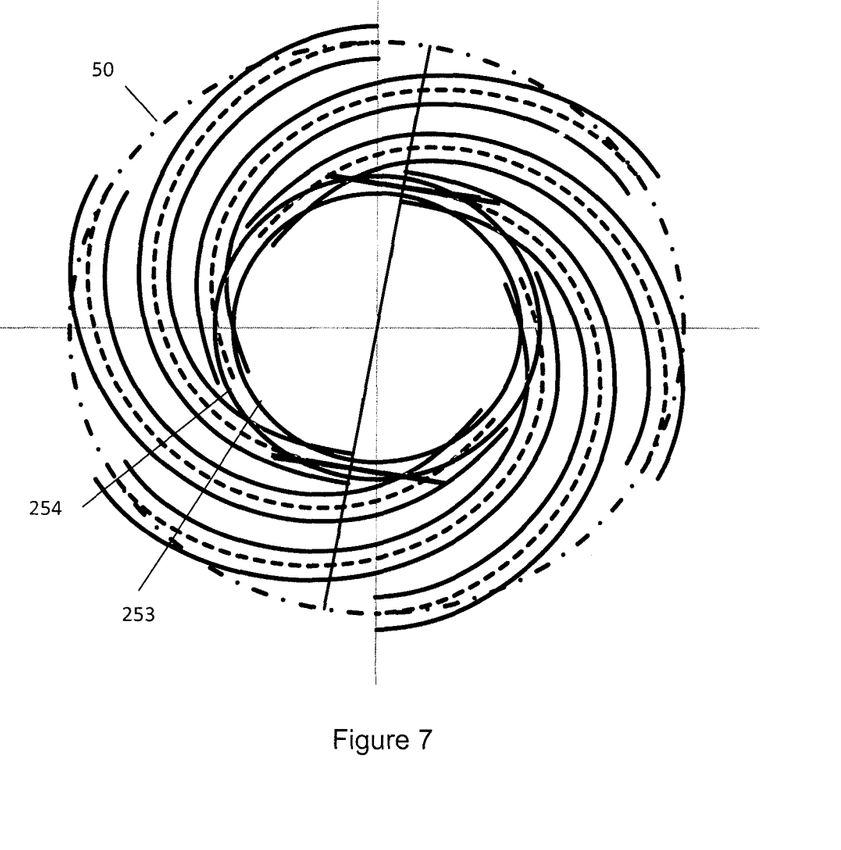
FIG. 7 is a plan view of a reaction turbine disc used with an impulse turbine.

FIG. 7 shows the inlet to a reaction turbine from an impulse turbine as solid lines 253, 254. Because the hot gas from the impulse turbine has no angular velocity relative to a fixed observer, the channel angle in the rotor must maintain this condition for the zero pump work condition described earlier. Also as noted earlier, there are many possible velocity profiles that satisfy this condition. The illustrated path is based on a minimum loss, maximum efficiency profile, but other profiles can be adapted for particular cases.

As described earlier, the flow emerging through the inlet is entirely axial, as seen by a fixed observer. This flow then turns 90 degrees as it encounters the deflector, or the bottom of the reaction turbine. Mass conservation (what comes in must equal what goes out) therefore requires that the axial flow exit cross sectional area (impulse outlet) must equal the radial flow cross sectional area (reaction inlet). That is, the downward flow area must be the same as the radial flow area after turning 90 degrees. This restriction thus sets the spacing between the end of the buckets and the deflector. As noted earlier, additional refinements include gradual turning to avoid turbulence, as well as other standard fluid mechanics techniques.

The emerging gas thus consists of a swirling (tangential) flow, along with a radial component created from the axial flow from the impulse turbine, as seen by a moving observer. This flow is continuous and uniform. The flow in the channels, however, is separated. The figures illustrate 6 channels, but in practice as little as 2 channels can be used. More channels can be used, the only restriction being equal angle spacing for balanced forces and torques.

The remaining concern is therefore to guide the continuous flow emerging from the impulse turbine into the rotors. This separation requires guide vanes as per standard fluid mechanics procedures to minimize turbulence and other losses.

The overall design principle, however, is again mass conservation. In this case, the total cross sectional area of the continuous output flow from the impulse turbine must equal the combined cross sectional areas at the entry points of the 6 channels in the reaction turbine. Referring again to FIG. 7, each of the six channels thus receives the flow from 60 degrees (one sixth of the total 360 degrees) of the emerging continuous flow. Quantitatively, the width of the impulse exit, multiplied by the length of this exit segment (the radial distance times the subtended 60 degree angle in radians) yields an area equal to the inlet area of the respective channel.

As described above, these channels are of constant depth except near the inlet. At this point, the depth can be decreased and the width increased until the channels meet (not shown in this case for clarity). Furthermore, in FIG. 7 note that the channels are not orthogonal to the input disc radius. In this case, the angle is described by the previously discussed matching of opposing angular velocities of the rotor and gas. As indicated in FIG. 7, the channels thus extend into the incoming gas stream. Combined with the smooth, continuous entrance geometry, this extension prevents the Helmholtz instabilities (gas pressure fluctuations across moving boundaries) that limit Fabris and similar units.

The momentum vectors are thus matched as described above for the impulse and reaction components. Combined with matched flow areas, the net result is a smooth, highly efficient transition from the continuous impulse turbine exit to the discrete flow channels of the reaction turbine. In all of the above configurations, the combustor can be a conventional pressurized device, or the output of one or more pulse jets.

Conventional gas turbines consist of a compressor, combustor, and power stage. While this approach is well-suited for most applications, some aerospace applications require minimum space and weight. To address this need, the previously described compressor, combustor, and power stage of the new turbine can be combined into a single unit.

The key consideration here is that the rotor channels of the previously described configuration are designed to prevent "self compression" of the gas in the rotor; otherwise, the motion of the rotor compresses the gas, which results in a higher exit velocity, which in turn causes more compression, etc., until the system fails at excessive speed.

The modification to a single component engine thus requires using the inner part of the rotor as the compressor for the cool incoming gas, thereby eliminating the need for an off-board compressor. The compressor section is then followed by an onboard combustor chamber. This arrangement thus yields a "lifted" flame: combustion occurs downstream of the axial injector in an expanded region, much like a propane torch operated with an excessive flow rate. The output exhaust gas then passes through the rotor channels as previously described. If a jet output is desired instead of shaft power, the rotor channels can be shortened to leave a pressure head for thrust. Under this arrangement, no impulse turbine is necessary.

Figure 8:
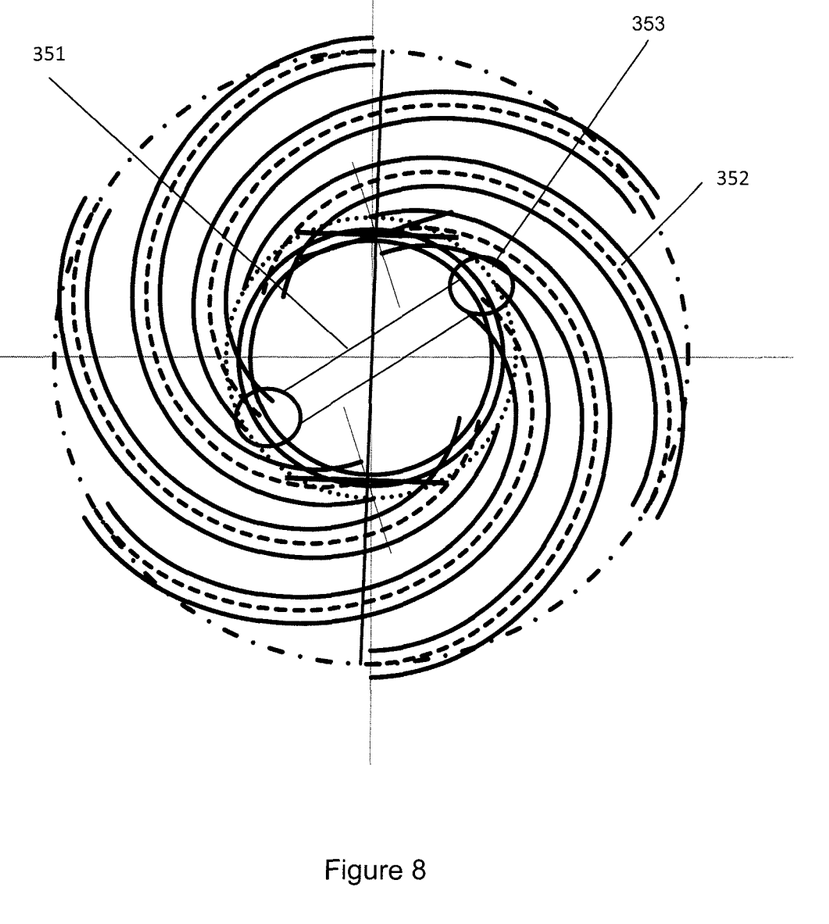
FIG. 8 is a plan view of a reaction turbine disc having a compressor and combustion chamber mounted to its top surface.
Figure 8A:
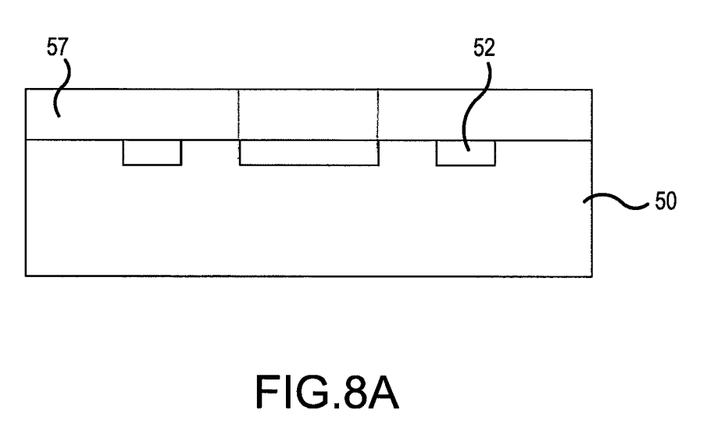
FIG. 8a is a cross sectional view of a disc having channels 52 formed in a channels formed in a top surface and covered with a membrane 57.

The overall arrangement is shown in FIG. 8, where the straight channels comprise the compressor section 351. For clarity, only one straight channel 351 and two combustion chambers 353 are shown, but in practice each pair of curved channels requires a straight section (3 total in this example having six channels) and a pair of combustor chambers (6 chambers in this example). The compressor section and combustion chambers are located on top of the rotor disc, with a shaft extending from the bottom of the rotor. The channels 352 are similar to the channels depicted in FIG. 7. Also, the combustion chambers can be joined to form a common single combustor. For example, in the figure the feed channel from the impulse turbine has become a common combustion chamber.

Figure 9A:
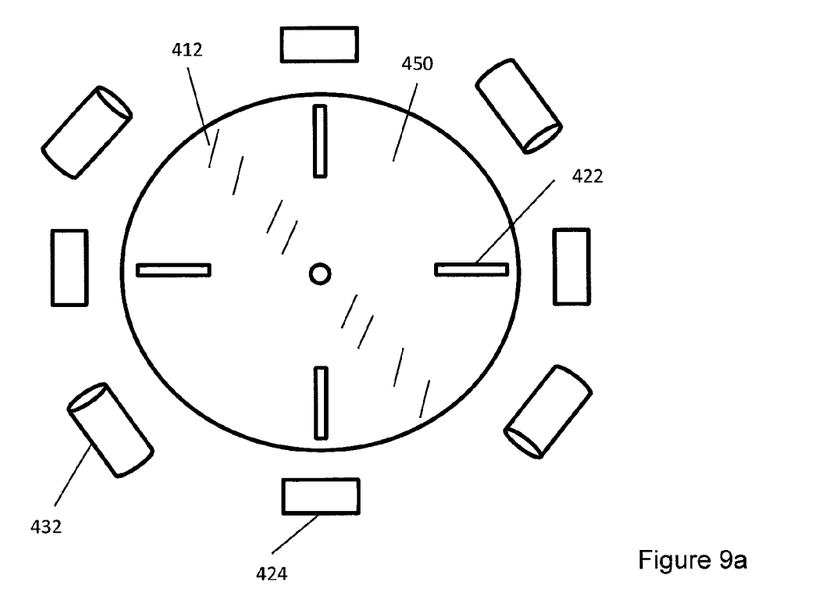
FIG. 9a is an end view of a turbine having magnet bearings and cooling fins.
Figure 9B:
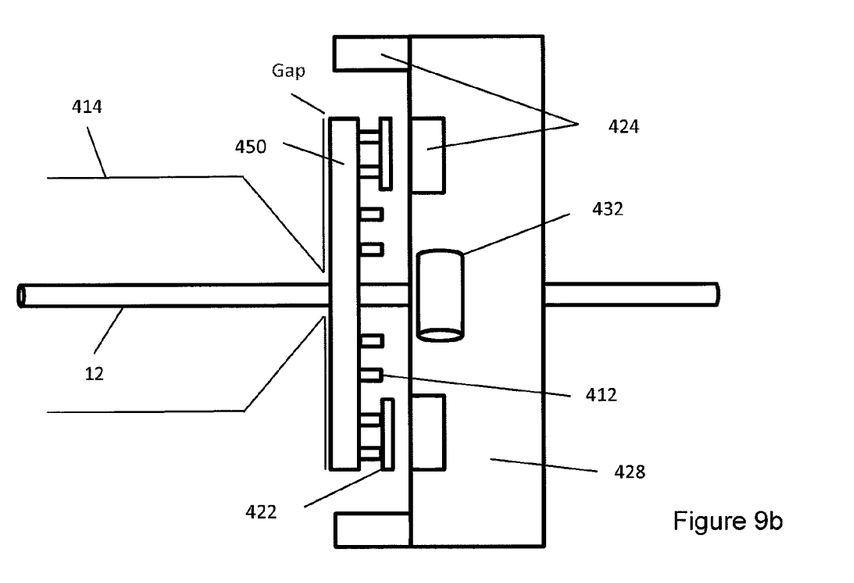

FIG. 9A is an end view of a rotor 450 supported by magnets. As mentioned above, the rotor 450 is provided with channels formed in a top surface of the disc. Rather than seal the top of the channel with a membrane, a housing of combustor 414 seals the top of the rotor 450, even though there is a small gap. Pickup coils 432 can be arranged about the disc for direct electric power generation.

The rotor has cooling fins 412 arranged along a diameter of the rotor 450. The cooling fins can be used alone or in conjunction with the cooling channels described above. Both the cooling fins and cooling channels rely on for cool ambient air to reduce the temperature of the rotor. Keeping the rotor at a cool temperature maintains the strength of the turbine at high speeds. However, the fins do cause some aerodynamic drag.

The need to keep a rotor cool is especially important when magnets are used with the rotor as magnets are sensitive to extreme temperatures. The magnets include rotor magnets 422 and support magnets 424. The rotor magnets require space between the magnet and the disc for the passage of cooling ambient air. The magnets perform two functions. The rotor magnets are moving and oppose the fixed magnets on the casing 428. The rotor magnets and support magnets act as magnetic bearing to reduce the load on the existing conventional bearings or even eliminate the need for conventional bearings. The use of magnetic bearings in place of conventional bearings increases efficiency and minimizes maintenance. Secondly, the moving magnets oppose copper wiring fixed in a casing to result in an electric generator. This arrangement has less weight, less vibration, fewer bearings, simpler couplings and higher efficiency than conventional shaft driven generators.

Figure 10:
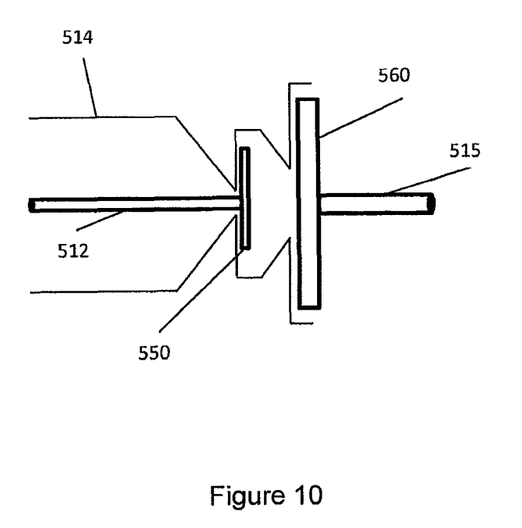
FIG. 10 is a cross section view of a system having two reaction turbines and a dual shaft.

The final configuration is a "split" or "dual" shaft geometry depicted in FIG. 10. In this arrangement, a first turbine connected to shaft within combustor drives a compressor, while a second turbine provides power to the load through a second shaft. In conventional systems, these turbines can be either radial or axial units. For the present invention, reaction turbines can drive either the compressor or the load, or both. Under this arrangement, the compressor can be driven at its preferred conditions, providing high pressure, high temperature gas to the second reaction power turbine that is operating at independent conditions. Furthermore, a reheater can be placed between these two stages, further broadening the response curve. The main advantages of dual shaft systems include easier starting, broader power curve, and the elimination of stalling. Compared to either conventional radial or axial turbines, the present reaction turbine is preferable for dual shaft systems because it has: (1) a short stage length, thereby yielding a compact overall system for maximum power at minimum weight, (2) high torque, due to the ejection of the working gas at the maximum tangential distance, and (3) high efficiency due to the absence of bypass losses.

The overall configuration is show in FIG. 10, where gas from the compressor 514 drives the first reaction turbine 550 to power the compressor using the first shaft 512. The exhaust from this first stage, which still contains most of the available energy, then proceeds to the second turbine 560. The second turbine 560 powers the load through the second shaft 515. The second shaft 515 is co-axial to the first shaft 512.

Both of the illustrated turbines are narrow gap units, but closed units, as well as conventional axial or radial units, are also acceptable. Narrow gap units, however, are particularly useful for dual shaft systems because any pressure losses in the gap in the first stage can be captured downstream in the subsequent power stage.

While the invention has been described with reference to preferred embodiments, variations and modifications would be apparent to one of ordinary skill in the art. The invention encompasses such variations and modifications, and is described in the appended claims.

We claim:

1. A hybrid turbine, comprising
a central shaft;
an impulse turbine stage comprising:
   a housing, the housing having a top surface and a bottom surface;
   an inlet and an outlet, the inlet being in the top surface of the housing the outlet being space from the inlet in an axial direction of the central shaft; and
   a plurality of buckets in the housing,
   wherein the central shaft extends through the top surface of the housing;
a reaction turbine stage comprising:
   a body;
   an inlet receiving fluid from the impulse turbine stage outlet;
   a plurality of outlets in a peripheral surface of the body; and
   a plurality of channels formed in the body, each channel extending from the inlet to one of the plurality of outlets; and
a conduit configured to supply a pressurized gas stream to the inlet of the impulse turbine stage;
wherein fluid supplied by the conduit flows through the impulse turbine stage before entering the reaction turbine stage.

2. The hybrid turbine of claim 1, wherein the plurality of buckets extend radially outwardly from the central shaft.

3. The hybrid turbine of claim 2, further comprising a cylindrical wall concentric with the conduit; and
an annular ring movable in an axial direction of the cylindrical wall, a diameter of the annular ring being equal to a diameter of the cylindrical wall.

4. The hybrid turbine of claim 1, wherein the
body is a disc shaped body.

5. The hybrid turbine of claim 4, further comprising separation wedges in the channels, the separation wedges extending inwardly from a sidewall of the channel.

6. The hybrid turbine of claim 4, further comprising at least one cooling hole, the at least one cooling hole formed between two channels; and
a cooling channel extending between the two channels from the cooling hole to the periphery of the body.

7. The hybrid turbine of claim 6, further comprising a scoop adjacent the at least one cooling hole for directing air in to the cooling hole.

8. A reaction turbine, comprising:
- a disc having a top surface, a bottom surface opposite the top surface, and a peripheral surface;
- an inlet in the top surface of the disc;
- a plurality of outlets formed in the peripheral surface of the disc;
- a shaft attached to the disc;
- a source of compressed fluids connected to the inlet on the disc;
- channels formed in the top surface of the disc, the channels extending from the inlet to a periphery of the disc, and the channels having a top coplanar with the top surface of the disc so as to be open;
- a cover having a top surface and a bottom surface, the bottom surface covering the top surface of the disc to form a top surface of the channels; and
- an inlet formed in the cover, the inlet in the cover being aligned with the inlet in the disc.

9. The reaction turbine of claim 8, wherein each channel comprises:
- a first section extending radially outwardly from the inlet to a first end; and
- a second section extending from the first end to the periphery of the disc, the second section being arcuate.

10. The reaction hybrid turbine of claim 9, wherein the first section has a decreasing cross sectional area as the channel extends from the reaction turbine section inlet.

11. The reaction turbine of claim 10, wherein the first section is frustroconical.

12. The reaction turbine of claim 10, wherein the first section has a constant height and a decreasing width in an outwardly extending radial direction.

13. The reaction turbine of claim 8, wherein an end of the second section is tangential to the periphery of the disc.

14. The reaction turbine of claim 8, further comprising a combustor housing,
- wherein the source of compressed fluids is a combustor, and
- wherein an extension of the combustor housing is the cover to close the channels.

15. The reaction turbine of claim 8, further comprising:
- a casing spaced from the disc;
- at least one support magnet on the casing; and
- at least one rotor magnet on the disc, the at least one support magnet and at least one rotor magnet operating as a magnetic bearing.

16. The reaction turbine of claim 8, further comprising cooling fins on the disc.

17. The reaction turbine of claim 8, further comprising:
- a membrane attached to the disc as the cover to close the channels;
- a pair of combustion chambers mounted to the disc; and
- a compressor extending between the pair of combustion chambers.

18. The reaction turbine of claim 8, further comprising:
- pickup coils arranged about the disc for direct electric power generation.

* * * * *